(12) United States Patent
Raick et al.

(10) Patent No.: US 7,384,489 B2
(45) Date of Patent: Jun. 10, 2008

(54) ATMOSPHERE CONTROL DURING CONTINUOUS HEAT TREATMENT OF METAL STRIPS

(75) Inventors: Jean-Marc Raick, Liege (BE); Jean-Pierre Crutzen, Embourg (BE); Edgard Dosogne, Ouffet (BE); Michel Renard, Slins (BE)

(73) Assignee: Drever International S.A., Liege (Angleur) (BE)

( * ) Notice: Subject to any disclaimer, the term of this patent is extended or adjusted under 35 U.S.C. 154(b) by 481 days.

(21) Appl. No.: 10/527,803

(22) PCT Filed: Sep. 11, 2003

(86) PCT No.: PCT/BE03/00149

§ 371 (c)(1),
(2), (4) Date: Mar. 14, 2005

(87) PCT Pub. No.: WO2004/024959

PCT Pub. Date: Mar. 25, 2004

(65) Prior Publication Data

US 2006/0037679 A1  Feb. 23, 2006

(30) Foreign Application Priority Data

Sep. 13, 2002  (BE) ................... 2002/0539

(51) Int. Cl.
C21D 1/76 (2006.01)
C21D 1/74 (2006.01)
C21D 9/573 (2006.01)
C21D 1/28 (2006.01)

(52) U.S. Cl. .................. 148/634; 148/639

(58) Field of Classification Search ........... 148/634; C21D 1/74, 1/76, 9/56

See application file for complete search history.

(56) References Cited

U.S. PATENT DOCUMENTS 4,966,632 A  10/1990  Vinckx et al.

(Continued)

FOREIGN PATENT DOCUMENTS

EP  0379104 A1  7/1990

(Continued)

OTHER PUBLICATIONS

Published Unexamined Patent Application, Publication No. Sho 55-1969, Method of Cooling Steel Strip with Gas Jet, Jun. 1974, pp. 1-8, 37-42.

*Primary Examiner*—Vickie Kim
*Assistant Examiner*—Mark L Shevin
(74) *Attorney, Agent, or Firm*—Browdy and Neimark

(57) ABSTRACT

A method for heat treating metallic strips inside a heat treatment chamber at a pressure greater than atmospheric pressure including passing the strips through at least one heating zone of the chamber and moving the strip through at least one cooling zone of the chamber. A first protective gas atmosphere containing nitrogen and hydrogen and/or helium is established in all but at least one cooling zone. The at least one cooling zone has a second protective atmosphere containing nitrogen and a second amount of hydrogen, the second amount of hydrogen is greater than the first amount. Nitrogen is introduced into the chamber, and a protective gas containing a third hydrogen content greater than the second hydrogen content is injected into the cooling zone, producing a gas exchange between one zone of the chamber having the first protective atmosphere and the cooling zone, and controlling the flow of introduction and injection.

15 Claims, 1 Drawing Sheet

U.S. PATENT DOCUMENTS

| | | |
|---|---|---|
| 5,137,586 A | 8/1992 | Klink |
| 5,798,007 A * | 8/1998 | Boyer et al. ............... 148/627 |
| 5,885,382 A | 3/1999 | Sakurai et al. |
| 6,224,692 B1 | 5/2001 | Cantacuzene |

FOREIGN PATENT DOCUMENTS

| | | |
|---|---|---|
| EP | 0815268 B1 | 1/1998 |
| EP | 0979879 A1 | 2/2000 |
| EP | 0795616 B1 | 11/2001 |
| FR | 2375334 | 7/1978 |
| GB | EP 0075438 A1 * | 3/1983 |
| JP | 07-233420 | 9/1995 |
| JP | 07 233420 | 9/1995 |
| JP | 11117024 A * | 4/1999 |
| JP | 2002003953 | 1/2002 |

* cited by examiner

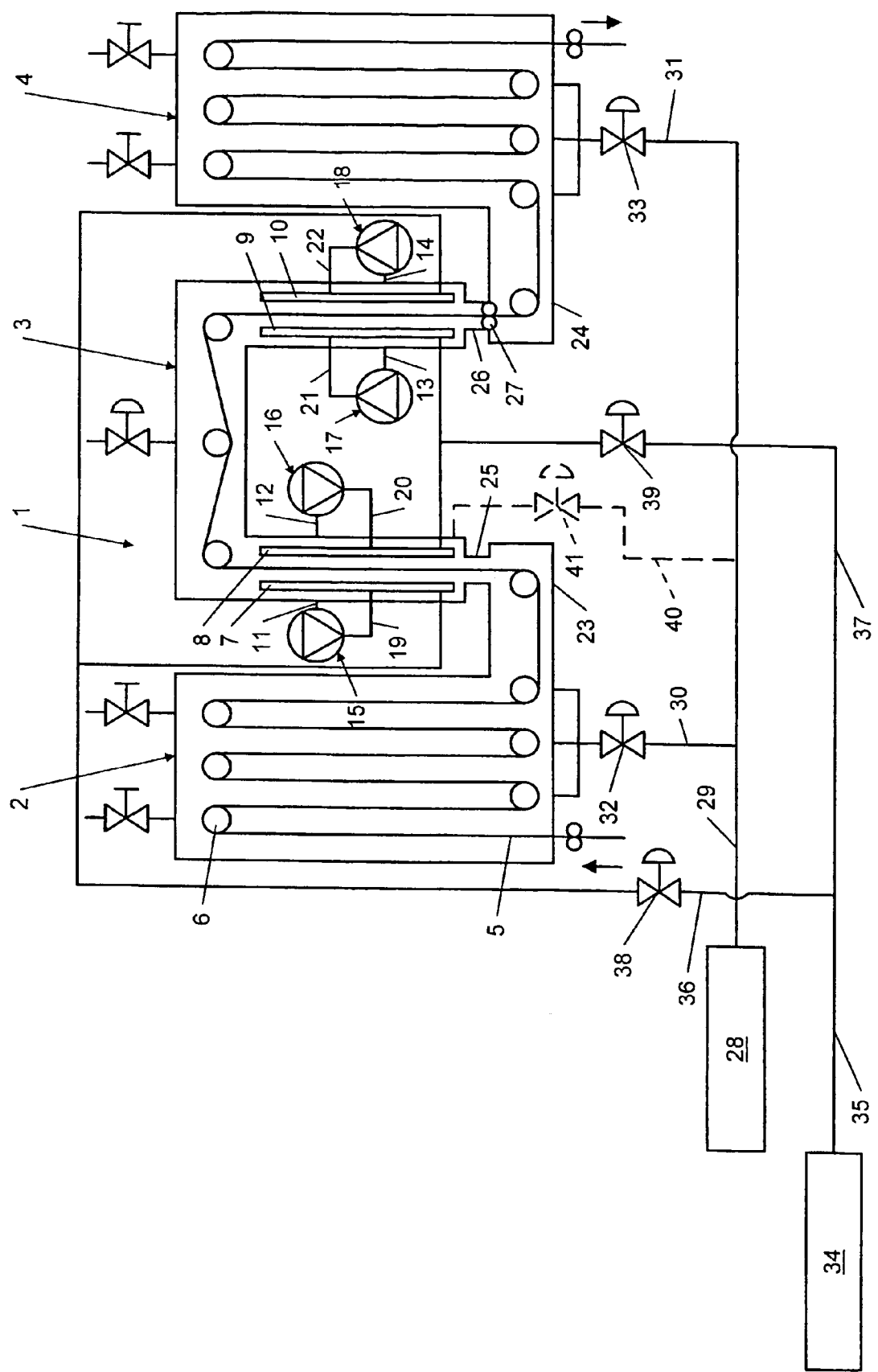

ATMOSPHERE CONTROL DURING CONTINUOUS HEAT TREATMENT OF METAL STRIPS

The present invention relates to a method for the heat treatment of metallic strips comprising, inside a heat treatment chamber having a pressure greater than atmospheric pressure, passing the strip through at least one heating zone of the chamber, moving the strip through at least one cooling zone of the chamber, and establishing a first protective gas atmosphere containing nitrogen and a first hydrogen and/or helium content in the chamber, with the exception of at least one cooling zone, in which there is adjusted a second protective gas atmosphere containing nitrogen and a second hydrogen and/or helium content greater than the said first content.

Furnaces for treating strips or sheets moving continuously have been known for a long time. These are used for example for the continuous annealing or continuous galvanisation of steel strips, as well as other types of installation where the strips are treated under a protective atmosphere.

These furnaces can contain one or more heating zones, with preferably a temperature maintenance zone, as well as one or more cooling zones, possibly separated by a over-ageing or equalisation zone.

In order to protect the moving sheet against any oxidation, it is known how to protect it by means of an atmosphere gas which may be nitrogen or a mixture of nitrogen and a small amount of hydrogen and/or helium. At the same time this atmosphere gas maintains in the chamber of the furnace a pressure slightly greater than atmospheric pressure.

Given the good heat transfer between the strip at high temperature and the hydrogen gas or helium gas, provision has already been made for adjusting, in a rapid cooling or quenching zone, an atmosphere of protective gas containing a mixture of nitrogen and hydrogen and/or helium with an appreciably greater hydrogen and/or helium content compared with that of the atmosphere prevailing in the rest of the enclosure (see for example JP-55-1969, FR-A-2375334, EP-B-0 795 616 and EP-B-0 815 268).

These installations require a rigorous partitioning as impermeable as possible between the cooling zone and the rest of the chamber, which involved the application of complex and expensive sealing devices at the entry to and exit from this zone. These devices generally comprise seals between which the strip must pass, with the risk of damaging the strip, and airlocks where inert gas is injected. Moreover, all these installations must necessarily provide one or more mixers where on the one hand hydrogen and/or helium and on the other hand nitrogen are mixed in the various required proportions before the introduction of the gaseous mixtures into their respective zone. The result is therefore here also an increase in the overall cost of the installation and a not insignificant additional bulk thereof through the presence of these mixers.

The aim of the present invention is to resolve these problems by developing a method for the heat treatment of metallic strips under an atmosphere of protective gas which allows effective cooling of the strip and is simple and of reasonable cost.

These problems have been resolved, according to the invention, by a method as described at the beginning, which comprises:

at least one introduction of nitrogen into the chamber, at least one injection of protective gas containing a third hydrogen and/or helium content greater than the said second content into the said at least one cooling zone having the said second atmosphere.

a gaseous exchange between at least one zone of the chamber having the said first atmosphere of protective gas and the said at least one cooling zone having the said second atmosphere, and control of the flow rate of the said at least one introduction and the said at least one injection according to the gaseous exchange between zones, the pressure in the chamber and the hydrogen and/or helium contents to be obtained in the said first and second protective gas atmospheres.

This method offers the advantage of not requiring any sealed partitioning system between zones of the chamber since on the contrary gaseous exchange between the zones is sought, and it provides no pre-mixing of different gases before they are introduced into the chamber. In addition, there is no additional consumption of hydrogen and/or helium gas since the total level remains the level usually used for this type of installation. Moreover, the hydrogen and/or helium gas is maintained in a greater proportion in the cooling zone, which improves the efficacy of the cooling and reduces any oxidation caused by stray entry of air at the seals and sheaths.

Nitrogen gas, in the introductory step, means not only a pure gas but also an industrial gas marketed as nitrogen gas, and which may contain small proportions of other elements, in particular hydrogen or helium.

Advantageously, the protective gas containing the said third hydrogen and/or helium content is hydrogen gas or helium gas. Hydrogen gas or helium gas means not only a pure gas but also an industrial gas marketed as hydrogen or helium gas, but able to contain elements in small proportions. It can also comprise a gas containing hydrogen and nitrogen which comes directly from an industrial process but without there being a mixture of the two elements. For example, it is possible to obtain such a gas by cracking ammonia NH3 into a product which contains 75% H2 and 25% N2.

According to an advantageous embodiment of the method according to the invention, it comprises, in the said at least one cooling zone having the said second atmosphere, an induction of the protective gas into a recirculation circuit, its cooling and its putting back into circulation in this at least one zone from the said circuit.

According to an improved embodiment of the method according to the invention, by the said flow control, it comprises, in the said at least one cooling zone having the said second atmosphere, maintenance of a pressure greater than the pressure of the chamber outside this cooling zone.

Other embodiments of the invention are indicated in the accompanying claims.

Other details and particularities of the invention will emerge from the description given below, non-limitingly and with reference to the accompanying FIGURE, of an installation for implementing a variant of the method according to the invention.

The single FIGURE depicts schematically a furnace for the continuous annealing of sheet metal in a protective gas atmosphere.

A furnace for the continuous annealing of moving steel sheets generally consists, in the direction of movement of the product, of the following sections: pre-heating, heating, temperature maintenance, cooling by gas jets, over-ageing or equalisation and final cooling.

The single FIGURE shows solely the central part of the furnace 1 with a temperature maintenance section 2, a rapid cooling section 3 and an over-ageing section 4. The other sections have been omitted for ease of reading the figure. The metal sheet 5 moves through these sections in the direction of the arrows.

In sections 2 and 4, the metal sheet is caused to move vertically by turning around return rollers 6. In the cooling section 3, an intense recirculation system for atmosphere gas is used. This system comprises, in the examples illustrated, two successive cooling zones each containing two vessels for projecting gas onto the metal sheet 7, 8 and 9, 10 placed on each side of the metal sheet, these vessels being provided with nozzles or slots for blowing gas onto the metal sheet. The recirculation system also comprises an induction conduit 11-14, provided at 15-18 with a fan and a heat exchanger, as well as a discharge conduit 19-22 connected to the corresponding vessel.

The various sections 2 and 3 as well as 3 and 4 are mutually connected by a connecting tunnel 23 or 24, preferably having a contraction 25 or 26. These tunnels cannot be made airtight and must therefore, according to the invention, allow gaseous exchange between the sections. Though guide rollers, for example the rollers 27, can be provided in these tunnels or contractions, they can under no circumstances serve to seal them.

The sections 2 and 4 are supplied with atmosphere gas from the source 28, which, in the example illustrated, is a source of pure nitrogen gas. This source is connected by the conduits 29, 30 and 31 to the various sections, by means of valves 32 and 33. The flow rate can be adjusted at the source 28 or for example by means of valves 32 and 33.

The section 3 is supplied with atmosphere gas from the source 34 which, in the example illustrated, is a source of pure hydrogen gas. This source is connected by the conduits 35 to 37 to vessels 7 to 10 of the cooling section 3, by means of valves 38 and 39. The flow rate can be adjusted at the source 34 or for example by means of the valves 38 and 39. The conduits 35 to 37 can introduce the protective gas at points other than the vessel, for example directly in the cooling section or advantageously in the recirculation circuit, upstream of the corresponding fan.

As depicted in broken lines, it can also be envisaged supplying nitrogen gas in the section 3 from the source 28, for example by means of the conduit 40 of the valve 41.

The functioning of this furnace is as follows:

In the sections 2 and 4 of the furnace, the pure nitrogen is injected from the source 28, the flow rate being slaved to the pressure which must preferably prevail in these chambers. It is preferable for the pressure to be greater than atmospheric pressure in order to prevent an infiltration of outside air inside the chamber to the maximum possible extent.

Provision can also be made for obtaining a pressure of 1 to 3 mbar in these sections, for example around 1.5 mbar.

In the cooling section, pure hydrogen is injected from the source 34.

In each section known instrumentation is provided for measuring the incoming gas flow, the pressure and the hydrogen level.

The total of the nitrogen and hydrogen flows introduced into the chamber is advantageously around 400 to 1000 Nm3/h, according to the size of the chamber.

The intense recirculation system of the cooling section 3 has a flow rate from 1000 to 5000 times the total atmosphere gas flow introduced to the chamber of the furnace. There is therefore an instantaneous mixing of the hydrogen injected into the recirculated volume, given the high ratio between the flow injected and/or introduced into the chamber (N2+H2) and the recirculated flow.

By controlling the flow rate of injection of hydrogen into the cooling section, it is possible to immediately regulate the required H2 content, for example to an order of magnitude of 5% to 25% by volume, or possibly even 50% by volume. It is for example possible after filling the chamber with nitrogen to inject hydrogen into the cooling section. It is also possible, simultaneously with the introduction of nitrogen into the sections 2 and 4, to inject separately, into the cooling section, nitrogen (through the conduits 40) and hydrogen (through the conduits 36 and 37), in the required proportions, then mixing, as indicated above, being instantaneous by virtue of the recirculation system.

The flow of hydrogen in the cooling section or the separate flows of hydrogen and nitrogen in this section can be determined and slaved according to a required pressure, preferably greater than that of the other areas, and for example equal to 3 mbar, and according to the average hydrogen level required in the rest of the furnace.

In operation, the amount of hydrogen in the cooling section can be modified by varying the hydrogen injection rate. The amounts of hydrogen before and after the cooling section can be controlled by modifying the rates of introduction of nitrogen into these sections upstream and downstream, and therefore the pressures which prevail therein. For example, if the pressure is increased upstream of the cooling zone compared with that downstream of this zone, the nitrogen/hydrogen mixture present in the cooling section will preferentially diffuse in the downstream area and will increase the amount of hydrogen therein.

In general terms, in the sections of the furnace other than the cooling ones it is possible to provide an amount of hydrogen of around 3% to 5% by volume.

It must be understood that the present invention is no way limited to the embodiments described above and that many modifications can be made thereto without departing from the scope of the accompanying claims.

The invention claimed is:

1. A method for heat treating metallic strips inside a heat treatment chamber having a pressure greater than atmospheric pressure, and wherein said heat treatment chamber has no sealed partitions between zones in the heat treatment chamber, said method comprising:
   a. passing the strip through a heating zone of the chamber;
   b. moving the strip through at least one cooling zone of the chamber;
   c. establishing a first protective gas atmosphere containing nitrogen and a first content of hydrogen and/or helium where the said content is from 3% to 5% by volume, in the chamber but not in the said cooling zone(s);
   d. establishing a second protective gas atmosphere in the said cooling zone(s) by providing a gas containing nitrogen and a second content of hydrogen and/or helium wherein the said second content is greater than the said first content;
   e. providing at least one introduction of nitrogen into the chamber;
   f. providing at least one injection of a third protective gas containing a third content of hydrogen and/or helium and optionally including nitrogen into the said cooling zone(s) wherein the said third content is greater than the said second content, whereby a gaseous exchange occurs between at least one zone of the said chamber having the first gas atmosphere and the said cooling zone(s) having the second atmosphere;

controlling the flow rate of the said introduction(s) of nitrogen and said injection(s) according to the gaseous exchange; and obtaining the pressure in the chamber and the content of hydrogen and/or helium from said first and second protective gas atmospheres.

2. Method according to claim 1, wherein the said injected gas is hydrogen or helium.

3. Method according to claim 1, wherein the injected gas contains nitrogen and said third content of hydrogen gas and each gas issues separately and directly from an industrial process without any prior mixing step.

4. Method according to claim 3, wherein the said injected gas containing nitrogen and hydrogen is an ammonia cracking gas.

5. Method according to claim 1, wherein the said nitrogen gas is introduced into the chamber solely outside the said cooling zone(s) having the second gas atmosphere.

6. Method according to claim 1, wherein the nitrogen gas introduced into the chamber in step e is introduced into the chamber simultaneously outside and inside the said cooling zone(s) having the second gas atmosphere.

7. Method according to claim 1, wherein the said second content of hydrogen and/or helium is between 5% and 25% by volume.

8. Method according to claim 1, wherein the pressure in the chamber is 1 to 3 mbar greater than atmospheric pressure.

9. Method according to claim 1, wherein the method further comprises an induction of the gas from said cooling zone(s) having the said second protective gas atmosphere into a recirculation circuit, cooling the gas, and then putting the gas back into the chamber at least one zone from said recirculation circuit.

10. Method according to claim 1, wherein the total flow of the gas from said introduction(s) and said injection(s) is 400 to 1000 Nm$^3$/h and the flow of recirculated gas is 1000 to 5000 times the flow of the gas introduced and injected.

11. Method according to claim 4, wherein the method comprises the said introduction of nitrogen into the chamber solely outside the said cooling zone(s) having the second gas atmosphere.

12. Method according to claim 4, wherein the method comprises the said introduction of nitrogen into the chamber simultaneously outside and inside the said cooling zone(s) having the second gas atmosphere.

13. Method according to claim 7, wherein the pressure in the chamber is 1 to 3 mbar greater than atmospheric pressure.

14. Method according to claim 8, wherein the method further comprises an induction of the gas from said cooling zone(s) having the said second protective gas atmosphere into a recirculation circuit, cooling the gas, and then putting the gas back into the chamber at least one zone from said recirculation circuit.

15. Method according to claim 9, wherein the total flow of the gas from said introduction(s) and said injection(s) is 400 to 1000 Nm$^3$/h and the flow of recirculated gas is 1000 to 5000 times the flow of the gas introduced and injected.

* * * * *